United States Patent
Ezendam et al.

(10) Patent No.: US 6,964,151 B2
(45) Date of Patent: Nov. 15, 2005

(54) CUTTING DEVICE WITH CUTTING CYLINDER UNIT HAVING CURVED CUTTING SURFACES FOR SHAPING A PLANT AND A VEHICLE PROVIDED WITH A CUTTING DEVICE OF THIS TYPE

(75) Inventors: Jan Pontianus Ezendam, Borne (NL); Nicodemus Assisius Ezendam, Hertme (NL)

(73) Assignee: Fa. Gebr. Ezendam V.O.F., Borne (NL)

(*) Notice: Subject to any disclaimer, the term of this patent is extended or adjusted under 35 U.S.C. 154(b) by 0 days.

(21) Appl. No.: 10/445,198

(22) Filed: May 27, 2003

(65) Prior Publication Data
US 2004/0103631 A1 Jun. 3, 2004

(30) Foreign Application Priority Data
May 24, 2002 (NL) .............................................. 1020673

(51) Int. Cl.[7] .......................... A01D 34/52; A01D 34/73
(52) U.S. Cl. ......................................................... 56/235
(58) Field of Search .......................... 56/235, 237, 13.7; 241/58; 30/216, 228

(56) References Cited

U.S. PATENT DOCUMENTS

| | | | |
|---|---|---|---|
| 2,097,761 A | | 11/1937 | Gallinant |
| 2,645,074 A | * | 7/1953 | Jones ........................... 56/13.7 |
| 3,873,038 A | * | 3/1975 | Wagstaff .................... 241/282.2 |
| 4,627,227 A | * | 12/1986 | Dixon ........................... 56/235 |
| 5,694,753 A | * | 12/1997 | Dellinger ....................... 56/234 |

FOREIGN PATENT DOCUMENTS

| | | | |
|---|---|---|---|
| FR | 1 079 581 | 12/1954 | |
| WO | WO 9812911 A1 | * 4/1998 | ............ A01G/3/04 |

* cited by examiner

Primary Examiner—Arpad Fab Kovács
(74) Attorney, Agent, or Firm—Young & Thompson

(57) ABSTRACT

A cutting cylinder unit and cutting divice for shaping a plant, such as a boxwood bush. The cutting device comprises at least one cutting cylinder unit. The cutting cylinder unit comprises a cutting cylinder with a surface of revolution which is rotationally symmetrical with respect to a cylinder center axis and with cutting members provided along the suface of revolution; a cylinder drive for driving the cutting cylinder in rotation about the cylinder center axis; and a cutting edge which is provided along the outside of the surface of revolution for interacting in a cutting manner with the cutting member. The surface of revolution and the cutting edge, as seen in the direction of the cylinder center axis, have corresponding curvatures. This curvature is substantially matched to a predetermined desired shape of the plant.

17 Claims, 4 Drawing Sheets

CUTTING DEVICE WITH CUTTING CYLINDER UNIT HAVING CURVED CUTTING SURFACES FOR SHAPING A PLANT AND A VEHICLE PROVIDED WITH A CUTTING DEVICE OF THIS TYPE

BACKGROUND OF THE INVENTION

The present invention relates to the use of a cutting cylinder unit for cutting a plant, the cutting cylinder unit comprising:

a cutting cylinder having a surface of revolution which is rotationally symmetrical with respect to a cylinder centre axis and having cutting members provided along the said surface of revolution;

a cylinder drive for driving the cutting cylinder in rotation about the cylinder centre axis;

a cutting edge which is provided along the outside of the surface of revolution for interacting in a cutting manner with the cutting members.

Cutting cylinder units of this type are known from cylinder mowers for mowing grass, a ground-covering plant. An example of such a unit which may be mentioned is NL-80.04241. The mowing device described in this document comprises a tractor provided with a number of, in this case four, cutting cylinder units. Each cutting cylinder unit comprises a cutting cylinder which is driven in rotation about a cylinder centre axis and has a cylindrical outer surface of revolution, a cylinder drive for driving the cutting cylinder in rotation, and a straight cutting edge which runs along the cylindrical surface of revolution. The cutting cylinder is provided with knife edges which are provided at relatively large intervals with respect to the cylinder centre axis, running helically along the inside of the cylindrical surface of revolution, and on the cutting members. The cutting edge is provided along the cylindrical surface of revolution in such a manner that it interacts in a cutting manner with the cutting members or at least the knife edges thereof which move past the cutting edge during rotation. Elsewhere, grass can be mowed using a cutting cylinder of this type. Known cylinder mowers of this type are only intended for cutting a ground-covering plant, such as grass, in a straight line and are eminently suitable for producing very flat lawns.

It is known to cut various plants, such as boxwood bushes but also hedges more generally and also other shrubs, such as yew, privet, etc., or trees, such as a bonsai tree, into a shape. This work is generally performed by hand. With the aid of a cutting device, such as hedge-clippers, the plant in question is cut into the desired shape. This is a time-consuming operation. Particularly for certain types of plants which are sold to distributors or purchasers by the cultivator after they have been cut into shape, this leads to labour-intensive work which takes up a relatively large amount of time.

SUMMARY OF THE INVENTION

As has been stated, what are known as cylinder mowers for mowing grass are already known, having been disclosed many decades ago. The applicant has now realized that cylinder mowers of this type can also be used with great success to shape trees or shrubs. Therefore, according to a first aspect, the present invention is based on the object of providing a cutting device which works efficiently and can be used to shape trees or shrubs, such as boxwood bushes, yew trees, privet bushes, bonsai trees, etc., in a mechanized fashion.

According to the first aspect of the invention, this object is achieved by the use of a cutting cylinder unit for shaping a shrub or tree, the cutting cylinder unit comprising:

a cutting cylinder having a surface of revolution which is rotationally symmetrical with respect to a cylinder centre axis and having cutting members provided along the said surface of revolution;

a cylinder drive for driving the cutting cylinder in rotation about the cylinder centre axis;

a cutting edge which is provided along the outside of the surface of revolution for interacting in a cutting manner with the cutting members.

If the surface of revolution of the cutting cylinder is cylindrical, as is customary for lawnmowers, a design which is also known as a straight mowing cylinder, then a cutting cylinder unit of this type can be used to impart a shape composed of straight lines or flat surfaces, such as cone shapes, pyramids, rectangles, squares, cubes, etc., to trees and shrubs.

However, according to a further aspect, it is also an object of the present invention to provide a method and a device for shaping plants in which the shape to be imparted to the plant is composed of curved lines.

The above object is achieved, in the use according to the first aspect, if the surface of revolution and the cutting edge, as seen in the direction of the cylinder centre axis, have a matching curvature. However, the abovementioned object is also achieved by the provision of a cutting device for shaping a plant, such as a boxwood bush, a yew tree, a privet bush, a bonsai tree, comprising at least one cutting cylinder unit, the cutting cylinder unit comprising:

a cutting cylinder having a surface of revolution which is rotationally symmetrical with respect to a cylinder centre axis and having cutting members provided along the said surface of revolution;

a cylinder drive for driving the cutting cylinder in rotation about the cylinder centre axis;

a cutting edge which is provided along the outside of the surface of revolution for interacting in a cutting manner with the cutting members;

which cutting device is characterized in that the surface of revolution and the cutting edge, as seen in the direction of the cylinder centre axis, have corresponding curvatures.

This curvature, which is therefore no longer a straight line, as in known lawnmowers, can be transferred to the plant in question when it is being cut. In this case, the cutting device can be moved along the plant so that the plant is stationary or the plant can be moved with respect to the cutting device, which then remains in a fixed position, or alternatively it is possible to move both the cutting device and the plant. By efficiently ensuring that the cutting device moves around the plant, it is possible to impart the curvature to the plant as a surface of revolution.

According to an advantageous embodiment of the invention, the curvature will be matched to a predetermined desired shape of the plant which is to treated. This makes it possible to use the cutting device to treat a large number of units of the plant in question in succession. However, the curvature of the surface of revolution and the cutting edge do not have to precisely match the curvature desired for the plant.

According to a further particular embodiment of the invention, the curvature of the surface of revolution will be concave with respect to the cylinder centre axis and the curvature of the cutting edge will be correspondingly concave with respect to the cylinder centre axis. This means that both curvatures are a concave curve, with the centre of the concavity lying closest to the cylinder centre axis. This makes it possible to obtain plants shaped convexly. The concave curvature of the cutting cylinder and concave curvature of the cutting edge may in this case be in the form of a sector of a circle, but may also be in different forms, for example may be pear-shaped in the form of a bulging barrel, etc. Furthermore, it should be noted that as an alternative to being concave, the curvatures of the surface of revolution and the cutting edge may also both be correspondingly convex with respect to the cylinder centre axis.

In particular if the shape which is to be imparted to the plant is strongly curved, according to the invention it is highly advantageous if the cutting device comprises at least two of the said cylinder cutting units which are provided with their respective cylinder centre axes crossing one another. The cutting cylinders will rotate about a fixed, straight cylinder centre axis and will in this way limit the curvature to be imparted to the plant, since it becomes very difficult to impart a curvature with local tangents which intersect one another at 90° or approximately 90° to the plant using one cutting cylinder unit in one operation. In order to prevent a device of this type, in a corresponding way to the mowing device which is known, for example, from NL 8004241, from leaving untreated zones of the plant between two adjacent cutting cylinder units after the treatment, according to the invention it is in this case preferable if, as seen during use in a direction in which the plant is processed, two cutting cylinder units overlap one another at their ends and if, at the location of the overlap, the curvatures of the respective cutting cylinder units are substantially identical. As will become clear, this results in a seamless transition between cutting cylinder paths. In a cutting device of this type with two or more cutting cylinder units, the curvatures of the respective cutting cylinder units may be identical to or different from one another.

To enable a rotationally symmetrical shape to be imparted to a plant without having to move the plant itself, i.e. for example while the plant's roots are still in the ground in the usual way, according to the invention it is advantageous if the cutting device according to the invention also comprises a rotary frame which bears the at least one cutting cylinder unit and if the said rotary frame can rotate about a plant centre axis, which will be the centre of the rotationally symmetrical shape of the plant. To ensure that the top of the plant is also shaped, according to the invention it is advantageous if the plant centre axis intersects an at least one cutting cylinder unit. Furthermore, to ensure that the plant has a certain volume, it will be advantageous if an at least one cutting cylinder unit lies at a certain distance from the plant centre axis. What is referred to as the plant centre axis will generally run vertically.

According to a further aspect, the invention relates to a vehicle provided with a cutting device according to one of the preceding claims. This vehicle may, for example, be a tractor. A vehicle of this type will preferably have axles which are higher than the height of the plant which is to be shaped, so that the vehicle can be driven over the plant which is to be shaped or has been shaped, with the left-side wheels on one side of the plant and the right-side wheels on the other side of the plant. In this way, an entire row of a plant of this type can be shaped in succession, optionally for each bush separately. If the bushes are to be shaped separately and in particular are to be provided with a rotationally symmetrical shape, it will also be preferable if the at least one cutting cylinder unit can be raised in the vertical direction and can also be lowered by means of lifting means.

The present invention also relates to the use of a cutting device according to the invention for shaping a plant, in particular a boxwood bush.

BRIEF DESCRIPTION OF THE DRAWINGS

The present invention will be explained in more detail below with reference to an exemplary embodiment which is diagrammatically depicted in the drawing, in which.

DETAILED DESCRIPTION OF THE PREFERRED EMBODIMENTS

Figure 2:
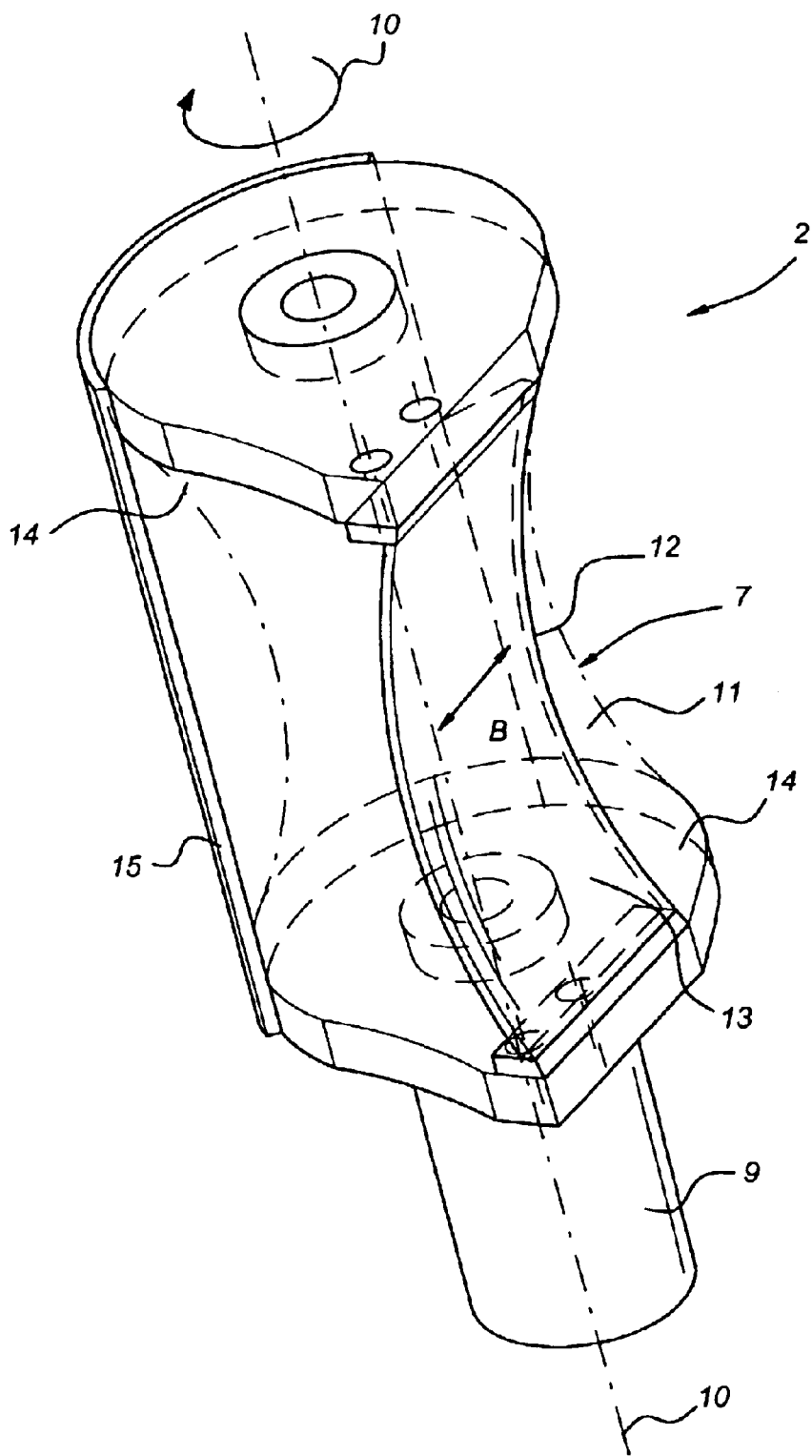
FIG. 2 shows a diagrammatic perspective view of a cutting cylinder unit according to the invention.
Figure 3:
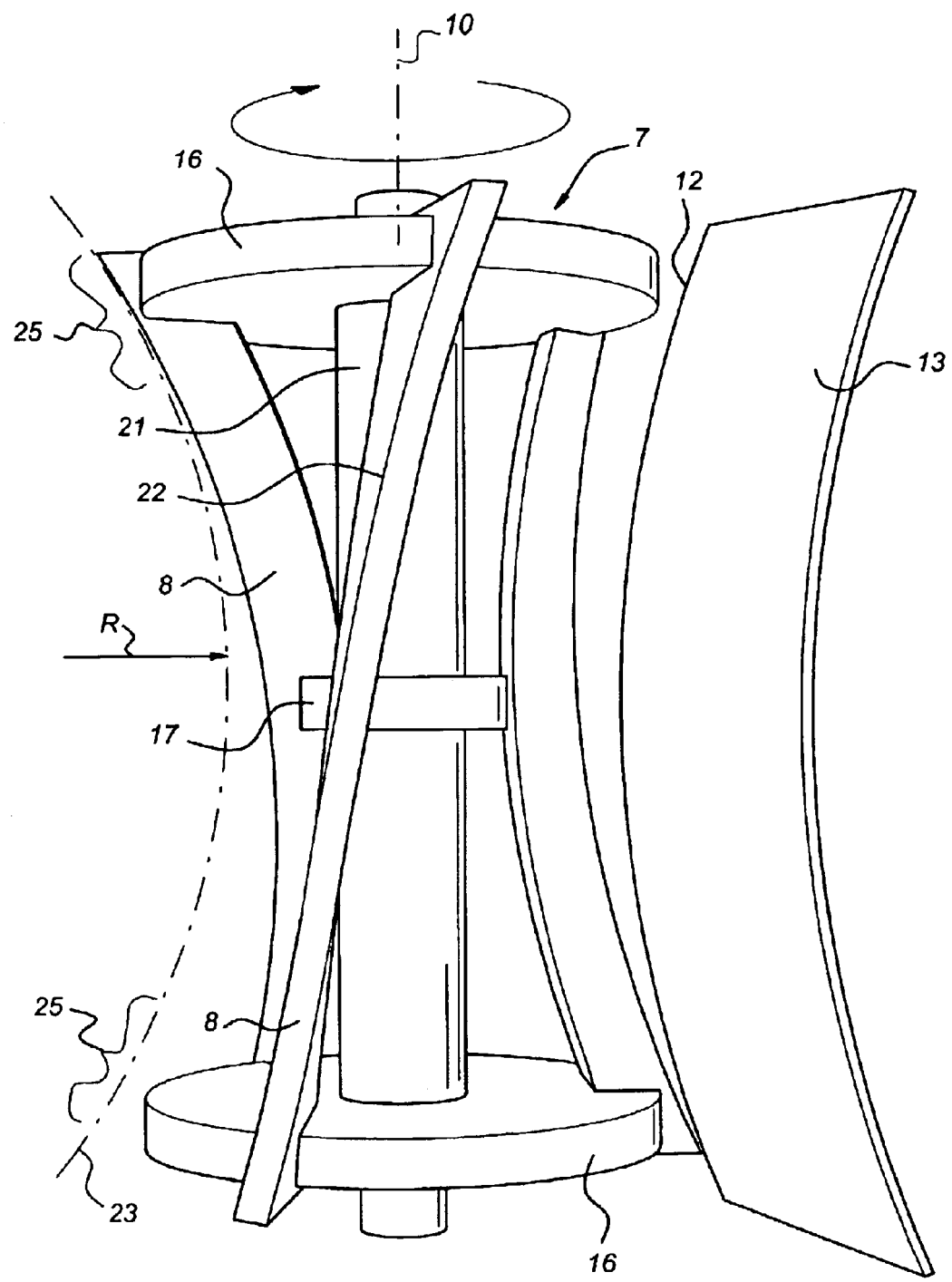
FIG. 3 shows a diagrammatic perspective view of a cutting cylinder and of a cutting plate provided with a cutting edge, both in accordance with the invention.

Referring first of all to the FIGS. 2 and 3, the invention comprises a cutting cylinder unit 2. This cutting cylinder unit 2 comprises:

a cutting cylinder 7 which can rotate about cylinder centre axis 10;

a cylinder drive 9 for driving the cutting cylinder 7 in rotation about cylinder centre axis 10; and a cutting edge (12) for interacting with cutting members 8 provided at the cutting cylinder 7.

Referring to FIG. 3, according to the exemplary embodiment illustrated, the cutting cylinder 7 is composed of an axle 21 with two end discs 16 and a middle disc 17. The diameter of the middle disc 17 is smaller than that of the end discs 16. These discs 16, 17 bear cutting members 8, of which in the example shown there are three. As is known per se from cylinder lawnmowers, these cutting members 8 extend in a helical pattern around the axle 21. As is also known from cylinder lawnmowers, the cutting edges 22 of the cutting members 8 define a surface of revolution 11 which is rotationally symmetrical with respect to the cylinder centre axis 10. According to the invention, however, the surface of revolution 11 defined by the cutting members 8, as seen in the direction of the cylinder centre axis 10, is curved instead of straight, as is the case with cylinder lawnmowers (in which case the surface of revolution would be cylindrical). In the exemplary embodiment shown, the curvature of the surface of revolution 11 is concave with respect to the cage centre axis 10, which in the exemplary embodiment shown results in a diabolo-shaped surface of revolution 11.

The cutting edge 12 is also correspondingly curved concavely to match the curvature of the surface of revolution 11. In this case, as is known per se from cylinder lawnmowers, the cutting edge 12 is located close alongside the surface of revolution 11 of the cylinder, in such a manner that this cutting edge interacts in a cutting manner with the cutting blade edges 22 of the cutting members 8 which move past the cutting edge 12 when the cutting cylinder 7 rotates. As shown in the exemplary embodiment illustrated, the cutting edge 12, apart from its curvature, extends purely in the axial direction with respect to the cylinder centre axis 10. However, it is also conceivable for the cutting edge 12 to extend helically around the cylinder centre axis 10, as is the case with the cutting blade edges 22 in the exemplary embodiment shown. If the cutting edge 12 extends helically with respect to the cylinder centre axis 10, the pitch of this helix will generally not be identical to the pitch of the cutting blade edge 22. If the cutting edge 12 extends helically with respect to the cylinder centre axis 10, it is also possible for the cutting blade edge 22, apart from the curvature of the surface of revolution 11, to run axially with respect to the cylinder centre axis 10, as is the case with the exemplary embodiment of the cutting edge 12 shown in the drawing. It will be clear to the person skilled in the art that numerous variants are conceivable in this respect.

What is referred to as the cutting edge 12 is formed on a plate 13 which, from a flat state, is curved in order to obtain a curvature which corresponds to that of the cutting edge 12. Therefore, the curvature of the cutting edge 12 continues unchanged over the entire width B of the cutting plate 13. With a view to safety, on the side which faces away from the plant during use, the cutting cylinder unit 2 is provided with a guard plate 15. This guard plate 15 may be in the shape of a sector of a cylinder and does not have to be provided with a curvature to match the surface of revolution 11. The advantage of there being a certain space between the surface of revolution 11 and the guard plate 15 is, inter alia, that the cutting cylinder will then be less likely to become jammed as a result of it becoming blocked by plant parts which have been cut off.

As indicated by the dashed line 23 and the arrow R in FIG. 3, the curvature, as seen in a plane enclosed by the cylinder centre axis 10 and a line which perpendicularly intersects this cylinder centre axis 10, may, in accordance with the example shown, be in the form of a sector of a circle with a radius R.

Figure 1:
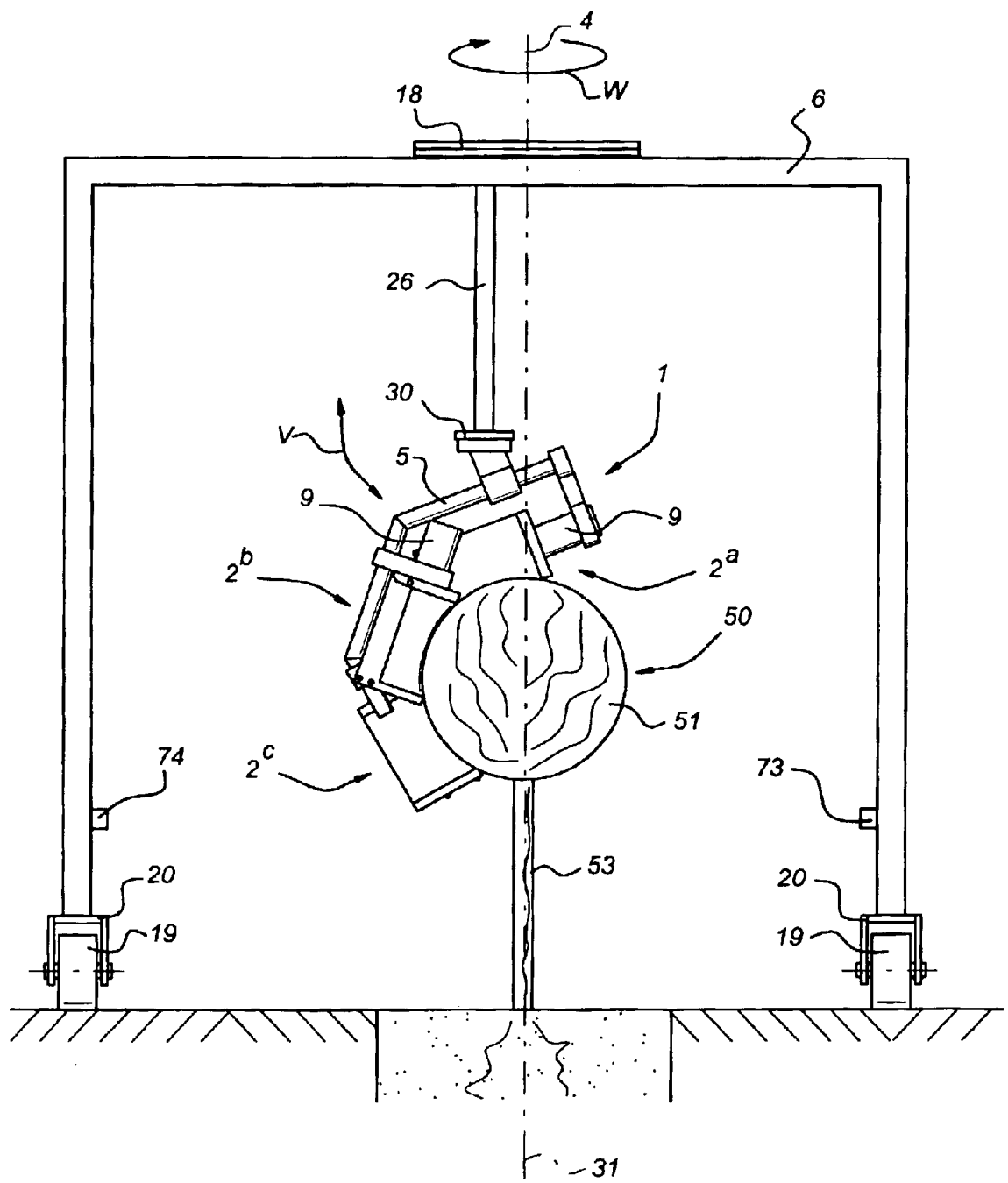
FIG. 1 shows a diagrammatic plan view of a cutting device according to the invention.

FIG. 1 shows a bearing frame 5 on which three cutting cylinder units 2*a*, 2*b* and 2*c*, corresponding to that described as cutting cylinder unit 2 in FIGS. 2 and 3, are arranged. The cylinder centre axes 10 (not shown in FIG. 1) of the cutting cylinder units 2*a* and 2*c* together enclose a flat plane, although this arrangement could differ. The cylinder centre axis 10 of the cutting cylinder unit 2*b* lies parallel to the plane enclosed by the cylinder centre axes 10 of the cutting cylinders 2*a* and 2*c*, in front of the said plane—at least as seen in the illustration presented in FIG. 1. One end 14 of the cutting cylinder unit 2*b* is overlapped by the adjoining end 14 of the cutting cylinder unit 2*a* and the other end of the cutting cylinder unit 2*b* is overlapped by the adjoining end 14 of cutting cylinder unit 2*c*. In the exemplary embodiment shown, the cutting cylinder units 2*a*, 2*b* and 2*c* are identical to one another, i.e. their curvatures are also identical to one another. This does not necessarily have to be the case. The abovenentioned overlap means that the zones 25 (cf. FIG. 3) of the surface of revolution 11 in each case overlap one another and therefore the cutting result for the shaped plant does not show that a plurality of cutting cylinder units have been used. Thee are no strips of plant which have not been treated or have beer treated to a lesser extent. With regard to an overlap of this type, it is highly advantageous if, at the location of the overlap ones 25, the curvatures of the surfaces of revolution 11 are identical to one another, although this does not mean that the overall curvatures of the surfaces of revolution 11 of the various cutting cylinder units 2*a*, 2*b* and 2*c* must necessarily be completely identical.

The bearing frame 5 is suspended, by means of a bar 26, from drive 18 supported by a main frame 6. This drive 18 is designed to rotate the assembly of bar 26, bearing frame 5 and, attached to it, the cutting cylinder units 2 about an axis of rotation 4, in the direction indicated by arrow W. The axis of rotation 4 will generally run vertically and will be positioned by manipulation by means of actuating means (not shown) in such a way that it once again coincides with the vertical centre axis of the trunk of the plant 50 which is to be shaped. The main frame 6 comprises a gantry structure supported by wheels 19 mounted in forks 20. In this way, the main frame 6 can be moved, transversely with respect to the plane of the drawing in FIG. 1, along a row of bushes 50 which likewise extends transversely with respect to the plane of the drawing in FIG. 1. The bushes 50 can then be shaped in succession one by one.

For the purpose of shaping in this example boxwood bushes 50, the main frame will in each instance be advanced until the axis of rotation 4 approximately coincides with the vertical trunk axis 31 of the boxwood bush 50 which is to be shaped. The cutting cylinder units may in the meantime be switched off, but will preferably remain switched on. As soon as the axis of rotation 4 has been correctly positioned with respect to the trunk centre axis 31, the drive 18 will be activated in order to cause the assembly to rotate through 360° about the axis of rotation 4 at least once. The result will be a spherically shaped boxwood bush 50, as shown in FIG. 1. The main frame 6 can then be moved on to the next boxwood bush, etc.

According to the invention, operation of the cutting device shown in FIG. 1 can be made even more efficient by making a few more specific modifications to the cutting device shown in FIG. 1. It is also possible for the main frame 6 to be advanced at a generally relatively slow but continuous speed, perpendicular to the plane of the drawing, and for the assembly comprising cutting device 1, bar 26 and drive 18 to be designed to be displaceable in a controlled manner with respect to the main frame 6. This controlled displaceability will comprise at least the option of translation in the direction of movement of the main frame 6, i.e. perpendicular to the plane of the drawing shown in FIG. 1. While the main frame 6 is then advancing at a specific first speed, the assembly comprising cutting device 1, bar 26 and drive 18 will then move at a second specific speed relative to the main frame 6, in such a manner that the assembly comprising cutting device 1, bar 26 and drive 18 remains in the same place with respect to the outside world, with the result that a plant, such as a tree or shrub, can be shaped in the correct way. This second speed relative to the main frame 6 will in particular be in the opposite direction to the first speed at which the main frame 6 is advancing with respect to the outside world and will in particular be equal to this speed, so that as seen from the outside world the assembly comprising cutting device 1, bar 26 and drive 18 remains in an unchanged location and can carry out the shaping treatment described above at that location without any changes. As soon as the boxwood bush in question has then been fully shaped, the assembly comprising cutting device 1, bar 26 and drive 18 will then be moved at a third speed in the direction of travel with respect to the main frame 6, in order to move on to the next boxwood bush. This third speed will in particular be directed in the same direction as the first speed at which the main frame 6 is advancing and will very particularly be greater, with respect to the outside world, than the first speed at which the main frame 6 is advancing. To enable the displacement of the assembly comprising cutting device 1, bar 26 and drive 18 with respect to the main frame 6 to be carried out automatically and in a controlled manner, the necessary control means will be provided. These control means will comprise sensors for determining the position of the boxwood bush with respect to the main frame 6, at least as seen in the direction of travel of the main frame 6. Sensor means of this type may, for example, comprise a light transmitter 73 and a light receiver 74 (similar to the entry detectors used in shops, etc.). As a result of this light transmitter 73 and light receiver 74 being positioned at a relatively low level, it is possible to observe that the trunk of a tree or shrub has been passed. In this way, it is possible to determine the position of the shrubs or trees 50 with respect to the main frame 6 as seen in the direction of movement of the main frame 6. If appropriate, this control system can be expanded by the addition of sensor means for detecting the location of the tree or shrub with respect to the main frame 6 in a direction which is transverse with respect to the direction of travel. This can be achieved by means of a second set of sensor means comprising, for example, a light transmitter and a light receiver, the light beam then being directed obliquely with respect to the direction of movement instead of transversely to the direction of movement, as is the case with the transmitter 73 and the receiver 74. In combination with the first set of sensor means 73, 74 it is then easy to determine the position of the trunk 53 in a plane parallel to the ground. If appropriate, this system may be extended by the addition of height sensor means for determining the height of the top 51 of the plant 50 above the ground.

The configuration of cutting cylinder units 2a, 2b and 2c and bearing frame 5 shown in FIG. 1 may also be designed differently. For example, without altering the result of shaping, it is possible for the cutting cylinder unit 2a to be positioned mirror-symmetrically with respect to the centre axis 4, in which case the bearing frame has to be modified in a suitable way. It is also possible for each of the cutting cylinder units 2a, 2b and 2c to be mounted completely independently of one another, rotated through any desired angle about centre axis 4, on the—suitably modified— bearing frame 5. The movement paths of each of the cylinder mower units 5 will in this case still overlap one another in accordance with claim 8 of the present patent application. If the length of the cutting cylinder units 2a, 2b and 2c is increased slightly, it is possible, after mirror inversion or rotation of the cutting cylinder unit 2a or 2c with respect to centre axis 4, to make do with two cutting cylinder units and to omit cutting cylinder unit 2b. The configuration will then resemble that shown in FIG. 4.

Figure 4:
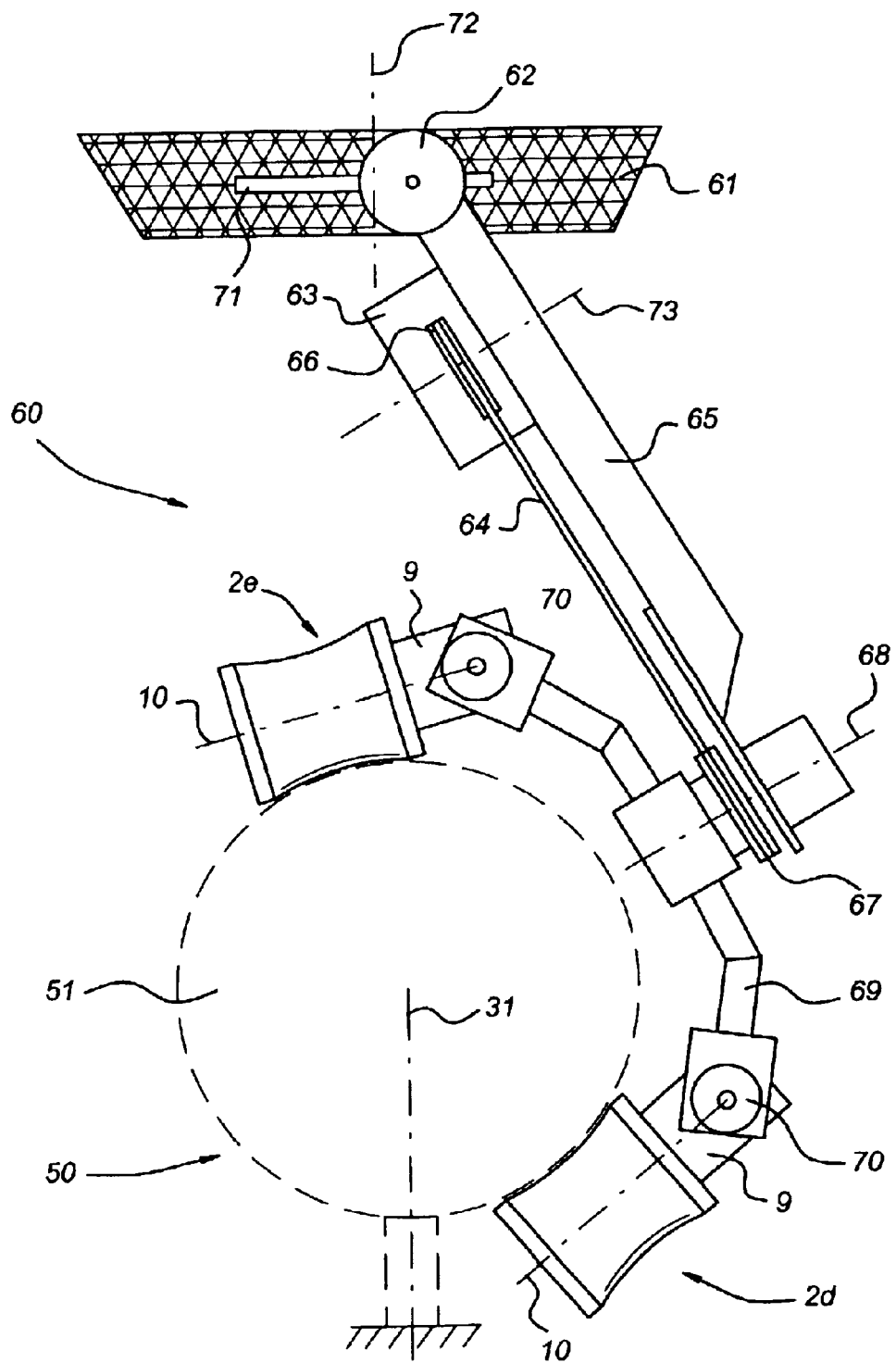
FIG. 4 shows a diagrammatic illustration, partially in section, but mainly in plan view, of a cutting device according to a further embodiment of the invention.

FIG. 4 shows a further variant of a cutting device according to the invention, which is denoted overall by 60. This cutting device 60 is indicated highly diagrammatically and the bearing frame on which this cutting device 60 is mounted has been omitted altogether. The cutting device 60 is composed of a slewing crane 61, which is illustrated in cross section and can rotate about centre axis 72. A bearing arm 65 is mounted in the slewing crane 61 in such a manner that is can be displaced along a slot 71 and can be fixed with respect to the slot 71. Fine adjustment can be achieved by movement within the slot 71. This bearing arm 65 can also rotate with respect to the slewing crane 61 about pivot 62. At its end remote from the slewing crane 61, the bearing arm 65 bears a second arm 69 which can rotate about axis 68 with respect to the bearing arm 65. Cutting cylinder units as described above, in this case denoted by 2d and 2e, are mounted on the bearing arm 69, in each case via a pivot 70. A drive 63 with a driven wheel 66 is mounted on the arm 65. A belt or chain 64 is mounted on the driven wheel 66 and on he other side is guided over a wheel 67. The wheel 67 is mounted in a fixed position on an axle 68. In this way, the arm 69 with the cutting cylinder units 2e and 2d on it can be rotated about the axis of rotation 68 73 by means of the belt or chain 64. As a result of the cutting cylinder units then being driven about their own axes of rotation 10 and at the same time being rotated about the axis of rotation 68 and also the crane 61 being rotated about the axis of rotation 72, it is possible for a boxwood bush 50 to be completely shaped by means of two cutting cylinder units 10 in one or more paths. In the meantime, the arm 65 can be pivoted about pivot 62 in order for it to be possible to shape another part of the boxwood bush. The pivots 70 provide the option of imparting spherical shapes of different radii to the bushes. In this case, depending on the desired radius, it is possible to fit in each case a different cutting cylinder unit 2d, 2e matched to this desired radius, but it has also proven quite possible to use just one type of cutting cylinder unit 2d, 2e, i.e. cutting cylinder units whose curvature has one specific radius, to create spherical bushes with different radii. As long as the radius does not deviate excessively, these change will be scarcely perceptible to the eye.

Referring to FIG. 4, it will be noted that in this case it is also possible to make do with just one cutting cylinder unit, i.e. cutting cylinder unit 2d or 2e can be dispensed with.

It will be clear that the cutting device according to the invention may have large dimensions but may also quite possibly have small dimensions, in such a manner that the cutting device can be used by hand. In the latter case, consideration will be given, for example, to cutting devices which are suitable in particular for shaping what are known as bonsai trees.

What is claimed is:

1. Cutting device for shaping a plant, comprising at least one cutting cylinder unit, the cutting cylinder unit comprising:
    a cutting cylinder having a non-cylindrical surface of revolution which is rotationally symmetrical with respect to a cylinder center axis and having cutting members provided along said surface of revolution;
    a cylinder drive for driving the cutting cylinder in rotation about the cylinder center axis;
    a cutting edge which is provided along the outside of the surface of revolution for interacting in a cutting manner with the cutting members;
    wherein the surface of revolution and the cutting edge, as seen in the direction of the cylinder center axis, have corresponding curvatures, so that said cutting device cuts a curved line in the plant.

2. Cutting device according to claim 1, wherein the corresponding curvatures are matched to a predetermined shape of the plant.

3. Cutting device according to claim 1, characterized in that the curvature of the surface of revolution is concave with respect to the cylinder center axis, and in that the curvature of the cutting edge is correspondingly concave with respect to the cylinder center axis.

4. Cutting device according to claim 1, in which the cutting edge is an edge of a cutting blade, and in which the curvature of the cutting edge, as seen in the tangential direction, continues unchanged in the cutting blade.

5. Cutting device according to claim 1, comprising at least two of said cutting cylinder units, the cylinder center axes of which cross one another.

6. Cutting device according to claim 5, in which, as seen during use in a direction for processing the plant, two cutting cylinders overlap at their ends, and in which the curvatures of the respective cutting cylinders are identical at the location of the overlap.

7. Cutting device according to claim 5, wherein the curvatures of the respective cutting cylinder units are identical to each other or different from each other.

8. Cutting device according to claim 1, comprising a rotary frame which bears the at least one cutting cylinder unit, the rotary frame being rotatable about a frame center axis.

9. Cutting device according to claim 8, in which the frame center axis intersects said at least one cutting cylinder unit.

10. Cutting device according to claim 8, in which said at least one cutting cylinder unit lies at a distance from the frame center axis.

11. Cutting device according to claim 8, in which the frame center axis runs substantially vertically.

12. Vehicle provided with said cutting device according to claim 1.

13. A cutting device for shaping a plant and comprising at least one cutting cylinder unit, the cutting cylinder unit comprising:

a cutting cylinder having a cylinder center axis and having plural cutting members that form a noncylindrical surface of revolution, when said cutting members rotate;

a cylinder drive for driving said cutting cylinder in rotation about said cylinder center axis; and a cutting plate extending substantially in a direction of said cylinder center axis and having a cutting edge which is provided outside of a surface of revolution of said plural cutting members and which is aligned with said plural cutting members so as to cut a plant therebetween when then said cutting cylinder is rotated;

said surface of revolution of said plural cutting members and said cutting edge having a corresponding arcuate shape, so that said cutting device cuts a curved line in the plant.

14. The cutting device according to claim 13, wherein said arcuate shape is concave with respect to the cylinder center axis.

15. The cutting device according to claim 13, comprising at least two of said cutting cylinder units, having cylinder center axes that cross one another.

16. The cutting device according to claim 13, wherein said cutting edge is curved about an axis substantially perpendicular to said cylinder center axis.

17. The cutting device according to claim 1, wherein said surface of revolution is substantially hourglass shaped.

* * * * *